United States Patent [19]

Schoepf et al.

[11] Patent Number: 5,062,084

[45] Date of Patent: Oct. 29, 1991

[54] BOREHOLE DIGITAL GEOPHONE TOOL

[75] Inventors: Victor L. Schoepf, Carrollton; Feroze J. Sidhwa, Coppell; John W. Bentley, Garland, all of Tex.

[73] Assignee: Mobil Oil Corporation, Fairfax, Va.

[21] Appl. No.: 571,341

[22] Filed: Aug. 23, 1990

[51] Int. Cl.$^5$ .......................... G01V 1/40; G01V 1/22
[52] U.S. Cl. ........................................ 367/13; 367/57; 367/79; 340/858; 346/33 WL
[58] Field of Search ................... 367/4, 13, 25, 57, 60, 367/78, 79, 911; 340/858; 374/136, 137; 346/33 WL

[56] References Cited

U.S. PATENT DOCUMENTS

| | | | |
|---|---|---|---|
| 3,946,357 | 3/1976 | Weinstein et al. | 367/78 |
| 3,959,767 | 5/1976 | Smither et al. | 340/18 P |
| 4,112,412 | 9/1978 | Howlett | 367/57 |
| 4,214,226 | 7/1980 | Narasimhan et al. | 367/57 |
| 4,398,271 | 8/1983 | Cretin et al. | 367/79 |
| 4,644,508 | 2/1987 | Zachariadis | 367/24 |
| 4,787,069 | 11/1988 | Beauducel et al. | 367/79 |
| 4,862,425 | 8/1989 | Cretin et al. | 367/13 |
| 4,901,289 | 2/1990 | Cretin et al. | 367/57 |

FOREIGN PATENT DOCUMENTS 1217850 2/1987 Canada .

OTHER PUBLICATIONS

Brochure, "Bolt Wellseis System for Interwell Tomography", Bolt Technology Corp., Norwalk, Conn.

Primary Examiner—Nelson Moskowitz
Attorney, Agent, or Firm—Alexander J. McKillop; Charles J. Speciale; George W. Hager, Jr.

[57] ABSTRACT

A method and apparatus for acquiring acoustical data from a borehole and is especially useful in carrying out tomogrphy surveys. The borehole digital geophone (BDG) tool of the present invention is capable of operating from a standard, 7-conductor logging cable with no special cables being required since the individual digital geophone modules (DGM) which form the BDG tool are connected together by short, separate lengths of the same 7-conductor cable. Each DGM acquires, digitizes, stacks, and stores data generated by its own three-component geophone assembly prior to transmitting these signals to the surface over a dedicated conductor in the cable thereby substantially increasing the sample rate of the tool which, in turn, substantially reduces the field time to run a tomography survey.

11 Claims, 5 Drawing Sheets

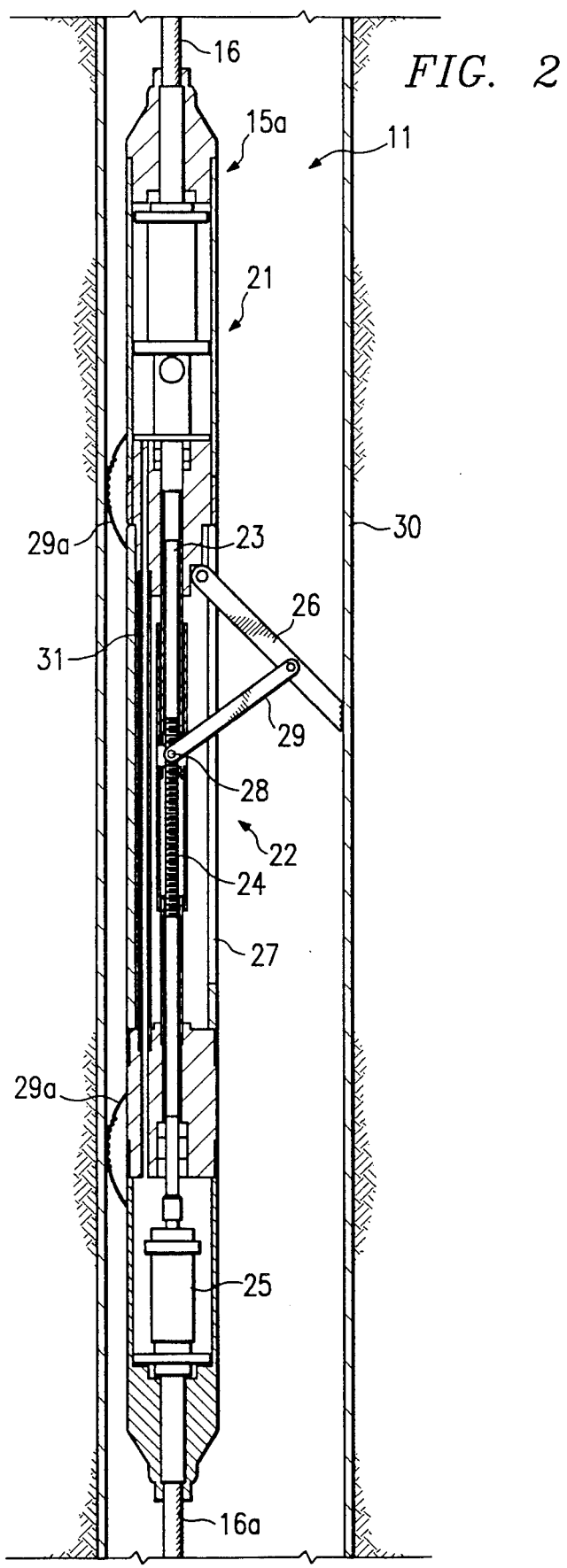
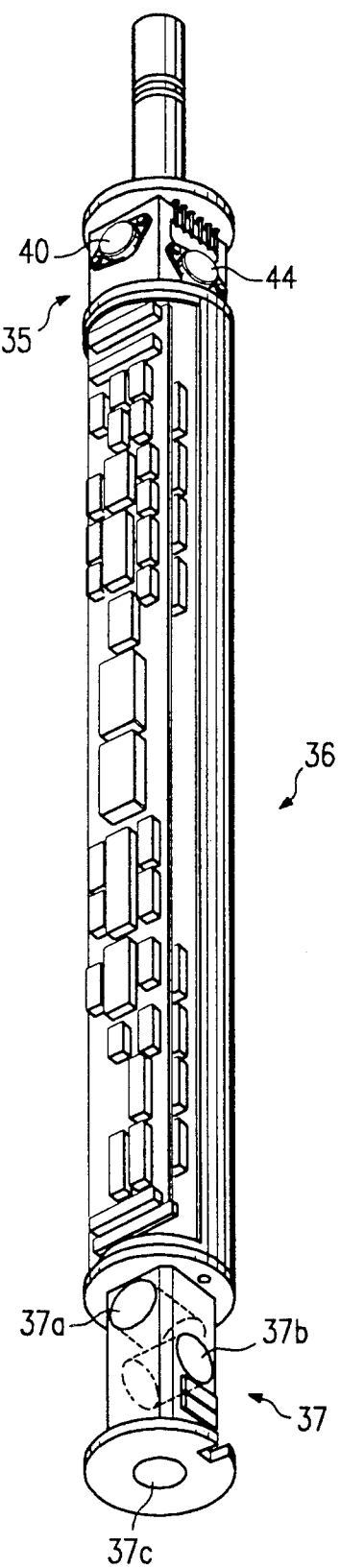
FIG. 2
FIG. 3

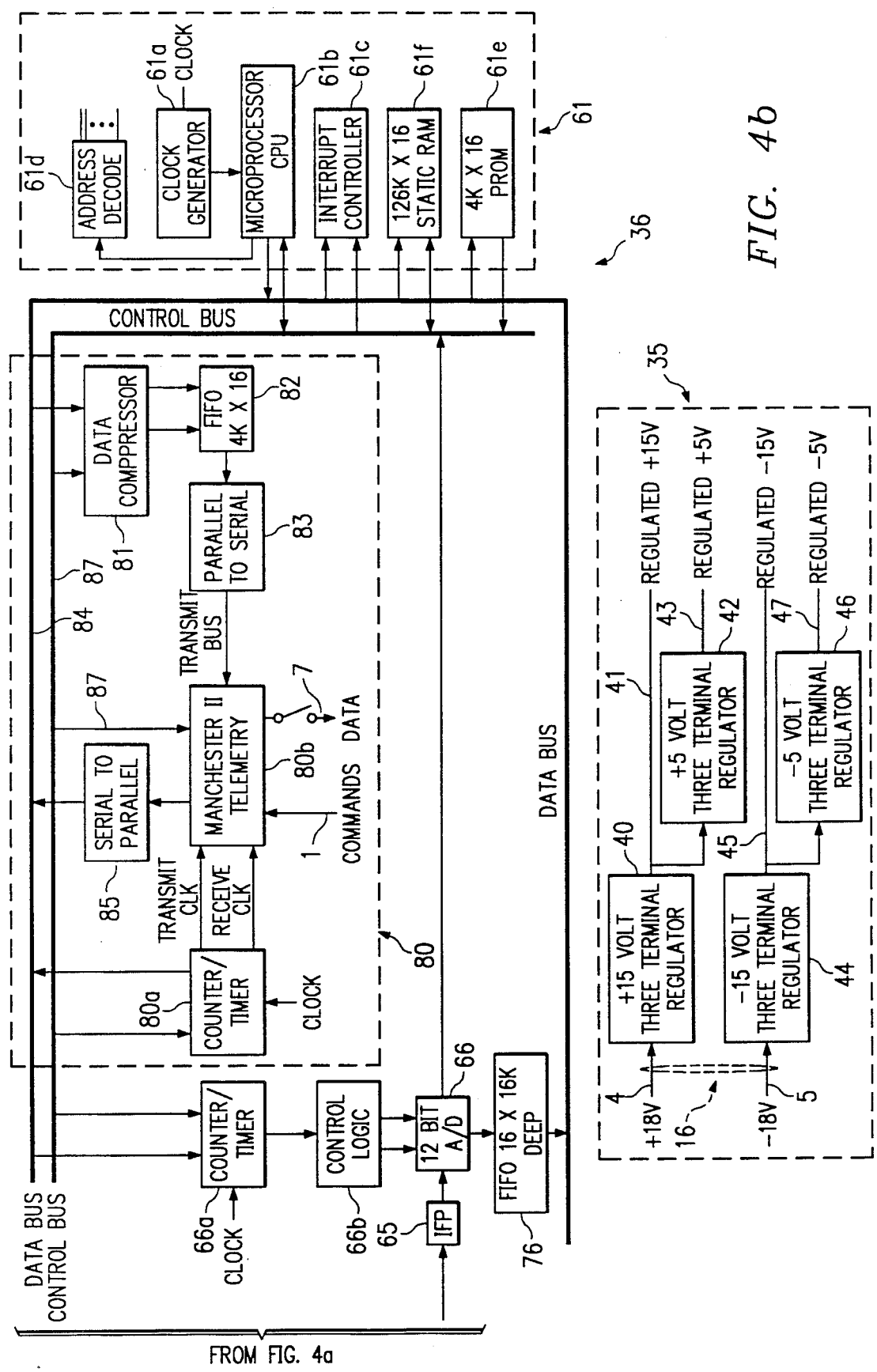

BOREHOLE DIGITAL GEOPHONE TOOL

DESCRIPTION

1. Technical Field

The present invention relates to the acquistion of acoustic information from a borehole and in one of its preferred aspects relates to a borehole digital geophone tool especially useful in seismic tomography.

2. Background Art

Cross-borehole seismic tomography is currently being investigated as a potential method for monitoring physical changes within a subterranean formation. For example, seismic tomography surveys have been used in monitoring the advance of an enhanced oil recovery (EOR) displacement front through a formation (i.e. the leading edge of a steam flood in a heavy oil reservoir). The results from these surveys indicate that tomographically-processed, cross-borehole data, can image variations in the velocity of acoustical signals as they travel through the formation. These velocity variations are believed to be caused by factors such as (a) the differring temperature within the formation and (b) differences in the materials (e.g. water, oil, etc.) which fill the pores in the formation.

These velocity variations are processed and presented as a cross-section profile between a source borehole and a receiving borehole. By interpreting these cross-borehole velocity profiles (commonly called "tomograms"), valuable information can be gained as to the physical changes which have taken place at the time the tomogram was taken.

To acquire a tomogram, a seismic energy source is placed in the borehole of a "source" well and a seismic receiver system is positioned in borehole of one or more adjacent "receiver" wells, all of which traverse the formation of interest. The energy source is actuated or "fired" to generate acoustical signals which travel through the formation being investigated. The signals are detected and recorded by the receiver system in a respective receiver well. The time it takes the signal to travel from the source well to the receiver well is associated with a particular path (i.e. "raypath") through the formation. By positioning the energy source and/or the receiving system at different locations within their respective boreholes, the times for a rectangular grid of raypaths can be recorded. For example, a typical tomography survey may consist of about 1600 raypaths derived from 40 source locations and 40 receiver locations. When an adequate number of raypath velocities have been recorded to properly establish a formation profile, the data is tomographically-processed to provide the desired tomogram.

Typical borehole receiver systems which have previously been used in acquiring tomography data generally consisted of a single, three-component geophone which is suspended from a standard 7-conductor logging cable. While such systems work well in acquiring the downhole data, they are slow and extremely time consuming in that the energy source has to be moved and repositioned in its well bore as many times (e.g. 40) as the receiver is repositioned in the receiver well (e.g. 40) in order to acquire data from the desired number of raypaths (e.g. 1600).

More recently, systems have been developed for running tomography surveys which include multiple sources and receivers so that several separate raypaths can be traversed from a single location without having to move either the sources or the receivers. As can easily be understood, by reducing the number of times which the source and/or receivers have to be physically moved within their respective boreholes, the field time, hence the expense, to run a tomography survey is substantially reduced.

However, the known systems using multiple sources/receivers still leave much to be desired. For example, one of better known of these systems includes an analog, multi-level tool consisting of 5 geophone modules which are interconnected by lengths of highly-specialized cable. These cables contain 31 separate wires which are wrapped around a hydraulic hose which provides hydraulic power to drive the clamping arms of each module. The whole cable assembly is then encased in a steel armor jacket and has a diameter of about 1.5 inches. This same cable is used to suspend the tool in the wellbore and extends all the way to the surface.

Each geophone channel in each module is connected to a dedicated pair of wires in the cable. Therefore, 15 channels use 30 wires with the remaining wire furnishing the power to the tool. The maximum number of modules is thus limited by the practical number of wires that can be constructed into this type of cable. The large number of wires in borehole cable provides problems in terminating the cable and maintaining reliability of all connections. Whenever power is applied to the modules from the surface through the cable, analog data from each channel is continuously sent up their respective pair of wires. The 15 channels are fed into a standard seismic recording system on the surface. This analog data however, is subject to distortion and loss of dynamic range and frequencey response due to the poor electrical characteristics of the long cable.

Another known system uses a plurality of modules which are suspended in a borehole on standard "7-conductor" logging cable. The top module digitizes analog data which is supplied from the satellite modules below it. The lower modules are all connected to the top module and to each other by lengths of special, multi-conductor cables which have the same disadvantages as described above. As far as is known, this system appears to do an analog-to-digital conversion of the data from a first channel, transmit it to the surface, convert the data from the next channel, transmit it to the surface, etc.. This transmission technique (i.e. time-multiplexed and channel-multiplexed) limits how fast the data can be digitized and transmitted since there are limitations on transmitting such digital data to the surface over standard 7-conductor logging cable.

DISCLOSURE OF THE INVENTION

The present invention provides a method and apparatus for acquiring acoustical data from a borehole and is especially useful in carrying out tomography surveys. The borehole digital geophone (BDG) tool of the present invention is capable of operating from a standard, 7-conductor logging cable (20,000–25,000 feet long) with no special cables being required since the individual digital geophone modules (DGM) which form the BDG tool are connected together by short, separate lengths of the same 7-conductor cable which eliminates the need for any specialized cables. Each relatively small DGM (e.g. 6 feet long, 3.25 inches in diameter) acquires, digitizes, stacks, and stores data generated by its own three-component geophone assembly prior to transmitting these signals to the surface over a dedicated conductor in the cable thereby substantially increasing the sample rate of the tool (e.g. $\frac{1}{8}$ msec.) which, in turn, substantially reduces the field time to run a tomography survey.

More specifically, the BDG tool of the present invention is comprised of at least two DGMs, each comprised of a housing having an upper end and a lower end. Each conductor in a standard, 7-conductor logging cable is connected to the upper end of the first DGM. Each DGM has means within its housing for effectively extending each of these conductors from the upper end to the lower end of the housing. The lower end of the first DGM is connected to the upper end of the second DGM by a separate length (e.g. 4 to 14 feet long) of the same standard, 7-conductor logging cable whereby each conductor in the logging cable effectively extends from the surface to the lower end of the last DGM in the BDG tool thereby making each conductor available in each DGM for its respective dedicated function.

All DGMs are the same and are interchangeable within the BDG tool. Each DGM has a means (e.g., a locking arm) for locking its housing against the borehole at its desired operational depth which is operated by an electric motor which receives power from the surface through a dedicated conductor in the cable. The geophone assembly in each DGM is comprised of one vertical and two horizontal sensors which detect acoustical energy and generate signals representative thereof. Each sensor has a separate channel for processing its respective analog signal before supplying the signal to an instantaneous floating point (IFP) amplifier which, in turn, applies a gain to each signal. These signals are then digitized and fed to a microprocessing system within the housing of the DGM where they are stacked and stored.

A transmitting assembly within the DGM then retrieves the signals upon command through a dedicated pair of conductors from the surface and sequentially transmits the signals to the surface through a dedicated transmission conductor in the cable. Each DGM also includes a temperature sensor for measuring the temperature and generating a signal representative thereof which is also transmitted to the surface.

In operation, the BDG tool is assembled and lowered to a desired depth in a borehole on a standard, 7-conductor cable. Power is then send down its dedicated conductors to the first (e.g. uppermost) DMG to power up the first module. Upon receiving power, the first DGM begins to transmit the header up the dedicated transmission conductor which informs the operator of the condition and status of the first DGM. When the first DGM is powered up, an address or logic unit number is sent to the first DGM which programs the first DGM to receive only commands addressed specifically thereto or global commands which are specifically addressed to all DGMs. Once the logic unit number has been received, the first DGM will stop sending the header. An operator at the surface issues a command to turn on power to the next module which actuates a relay which then supplies power from the dedicated power conductors in the cable through the first DGM onto the second or "next" DGM to power up the second DGM and the above procedure is repeated.

After all DGMs are powered up and have received their respective logic unit number, a motor is actuated in each DGM to extent a locking arm to lock the DGM against the borehole. A timebreak signal (i.e. the time that a source is fired in a source well) is then supplied to all DGMs simultaneously over a dedicated conductor so that all DGMs will begin to acquire data simultaneously. Acoustical data is then acquired, processed, stacked, stored and transmitted by each DGM as described above.

BRIEF DESCRIPTION OF THE DRAWINGS

The actual construction, operation, and apparent advantages of the present invention will be better understood by referring to the drawings in which like numerals identify like parts and in which:

FIG. 2 is a sectional view of the digital geophone module (DGM) of the present invention;

FIG. 3 is an enlarged perspective view of the geophone and electronic section of the DGM of FIG. 2;

FIG. 4A, 4B are schematical diagrams of the electronic section of the DGM of FIGS. 2 and 3;

BEST KNOWN MODE FOR CARRYING OUT THE INVENTION

Figure 1:
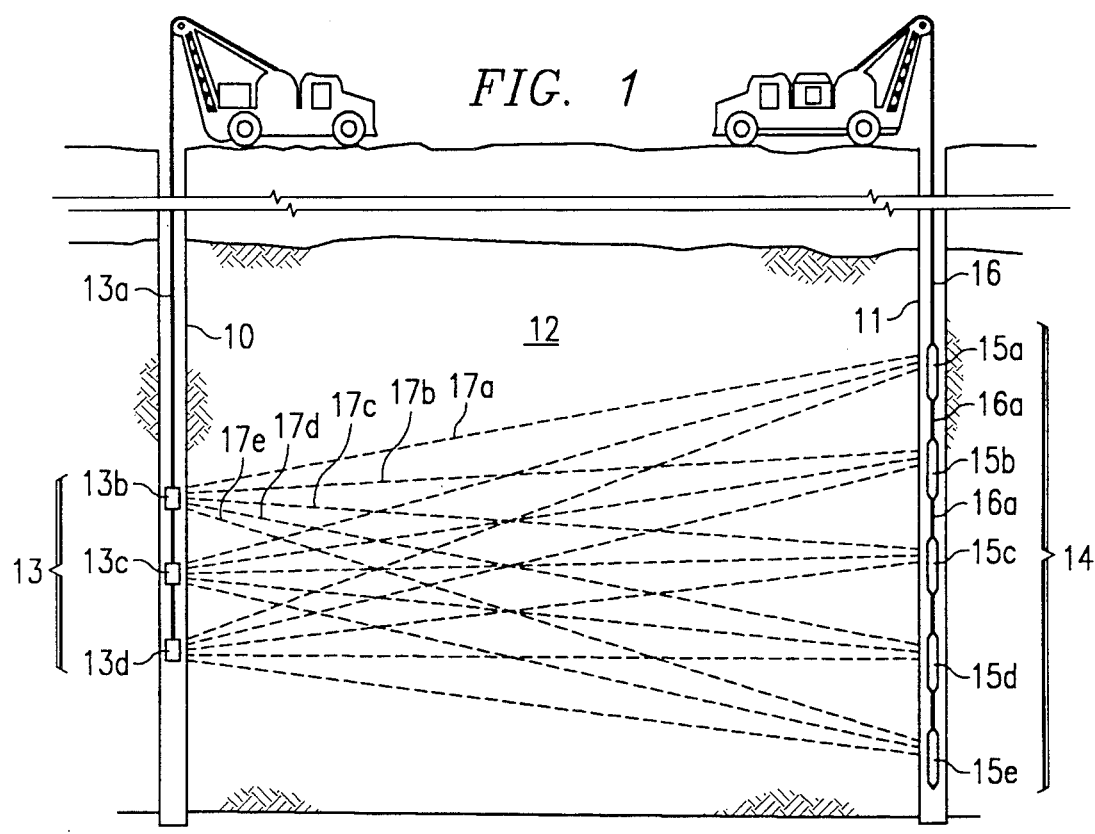
FIG. 1 is a sectional view illustrating a tomography survey being carried out between a source well and a receiving well.

Referring more particularly to the drawings, FIG. 1 illustrates a tomography survey as carried out in formation 12 between a source well 10 and one or more receiver wells 11 (only one shown) which are spaced (e.g. 1000 feet) from well 10. One or more energy sources (e.g. three) 13b-13d are suspended from cable 13a and are precisely positioned at known depths within borehole of well 10. Energy sources 13 may be comprised of any source which can generate sufficient acoustical energy to travel through formation 12 to the borehole of receiving well(s) 11. Preferably, source 13 is a borehole "airgun" which discharges a burst of compressed air upon command to generate the desired acoustical energy in formation 12, e.g. a borehole airgun available from Bolt Technology Corp., Norwalk, CT. Other types of energy sources (e.g. piezoelectric, magnetostrictive, imploders, etc.) are also known for this purpose.

A borehole digital geophone (BDG) tool 14 comprised of a plurality (e.g. 5) of receivers (e.g. digital geophone modules (DGM) 15a-15e) is suspended on a standard, 7-conductor logging cable 16 and is precisely positioned at a known depth in the borehole of well 11. After sources 13 and BDG tool 14 have been positioned within their respective wells, they are "fired", usually simultaneously to act as a point source and the acoustic energy generated thereby travels in different paths (called "raypaths"; only raypaths 17a-17e being numbered for clarity) through formation 12 to receivers 15a-15e, respectively, where the energy is detected and recorded. The sources and/or receivers are then repositioned at different depths within their respective wells and the operation is repeated until sufficient data is collected to provide the desire tomogram for formation 12.

In accordance with the present invention, BDG tool 14 is suspended on and operated by standard, 7-conductor logging cable 16 and is comprised of a plurality of DGMs (five shown in FIG. 1; 15a–15e) which are spaced from each other by short lengths (from 4 to 14 feet) of standard, 7-conductor logging cable. Each DGM 15 is identical in construction and is interchangeable with any other DGM. Accordingly, only one DGM will be described in detail.

Referring now to FIG. 2, DGM 15a is comprised of a housing 20 which includes a sealed, geophone and electronic section 21 and a locking arm section 22. Locking arm section 22 comprises a shaft 23 which is journalled for rotation in housing 20 and which is threaded along at least a portion 24 of its length. Shaft 23 is coupled to and is driven by reversible, electric motor 25. Locking arm 26 is pivotably mounted at the upper end of window 27 which is cut in the wall of housing 20. Arm 26 is pivotably connected to a threaded follower 28 by link 29. Follower 28 cooperates with the threaded portion 24 of shaft 23 whereby the follower will move up the shaft when the shaft is rotated by motor 25 in a first direction to extend arm 26 outward through window 27 and will move down on the shaft when the motor rotates the shaft in the other direction to retract the arm.

Figure 5:
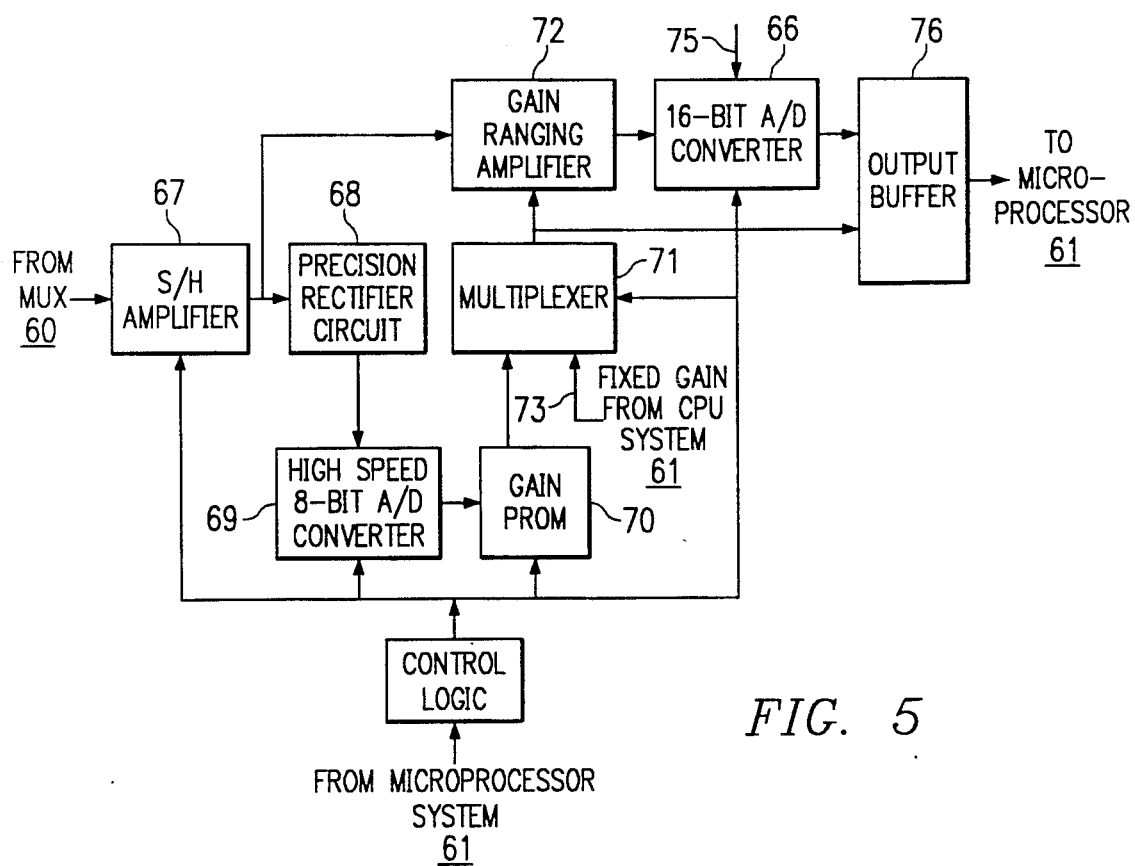
FIG. 5 is a further detailed schematical diagram of the instantaneous floating point (IFP) amplifier and the analog-to-digital (A/D) conversion system of FIG. 5.

Contact pads (serrated plates 29) may be spaced and affixed to the outer periphery of housing 20 on a side opposite window 27. Pads 29 will contact the casing 30 or borehole when housing 20 is moved to a locked position by arm 26 to thereby improve the acoustical coupling between the borehole and DGM 15. The electrical wiring which is necessary for operating DGM 15a and the "next" DGMs below (explained in detail below in conjunction with FIG. 5) is not shown in FIG. 2 for the sake of clarity but will pass through passage 31 in housing 20 from section 21 at the upper end of the housing to motor 25 and cable section 16a at the lower end of the housing.

As further shown in FIG. 3, geophone and electronic section 21 is comprised of voltage regulator section 35, electronic board assembly 36, and geophone assembly 37, all of which will be described in more detail below. Geophone assembly 37 is a three-component geophone assembly of the type commonly used in seismic operations and has two horizontal acoustic sensors 37a, 37b which lie at right angles to each other and one vertical acoustic sensor 37c. As will be understood, geophone assembly 37 senses or detects acoustical energy in their respective planes as the energy arrives at borehole 11 and each generates a respective analog electrical signal representative thereof. Electronic board assembly 36 receives the respective analog signals from geophone section 37 and digitizes, stacks, stores, and then transmits the resulting digitized signals to the surface through cable 16.

Figure 4A:
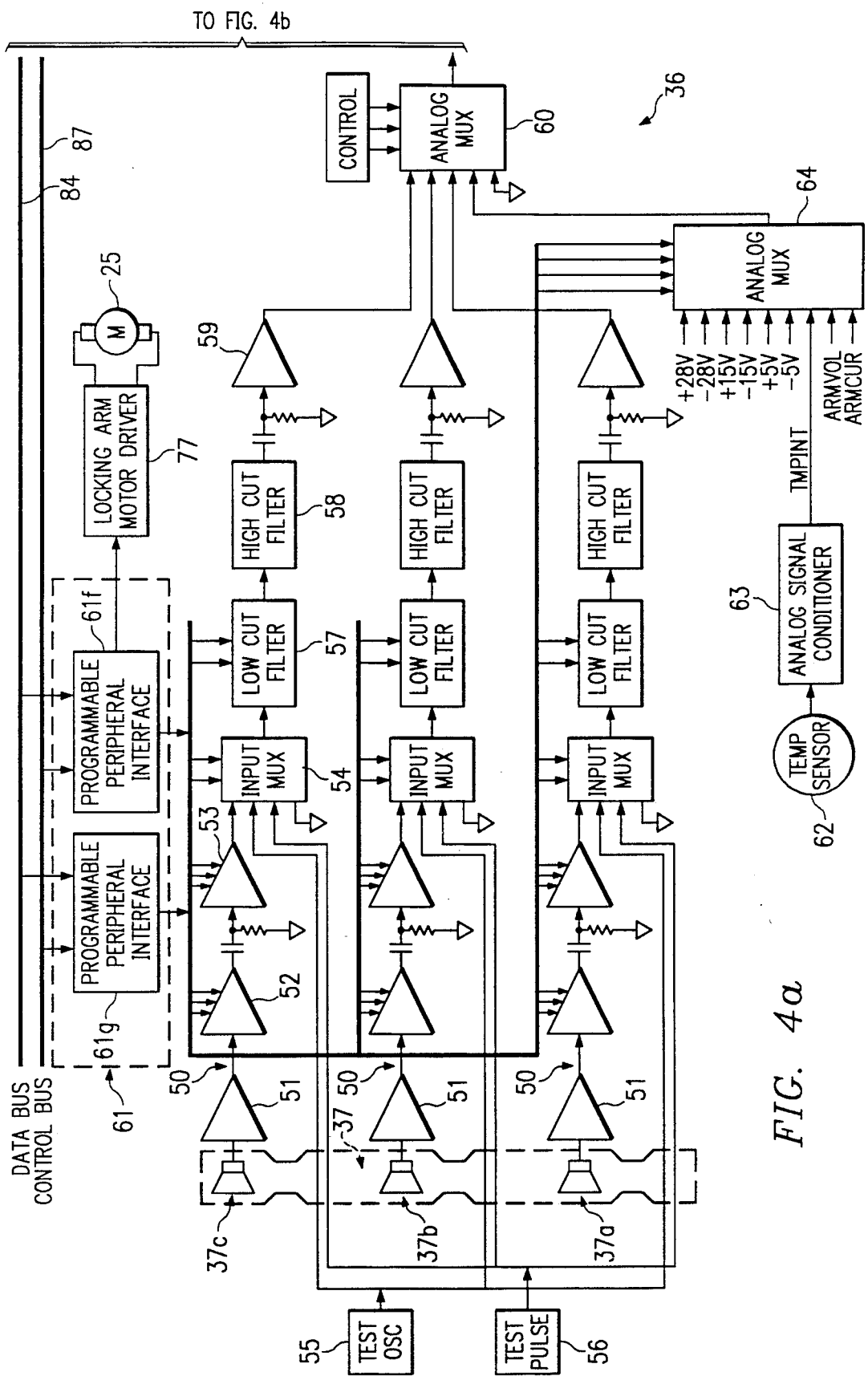

For a further description of geophone and electronic section 21, reference is now made to the schematic diagram of FIG. 4. voltage regulator section 35 supplies the constant, regulated voltages which are required to operate DGM 15. Regulator section 35 is comprised of a positive, three-terminal voltage regulator 40 which receives a positive voltage (e.g. +18 v DC) through conductor 4 of cable 16 and outputs a constant, regulated positive voltage (e.g. +15 v DC) through line 41 and also to a second positive, three-terminal voltage regulator 42 which, in turn, outputs a second regulated, constant positive voltage (e.g. +5 v DC) through line 43. Negative, three-terminal voltage regulator 44 receives a negative voltage (e.g. −18 v DC) through conductor 5 of cable 16 and outputs a constant-,regulated negative voltage (e.g. −15 v DC) through line 45 and also to a second, negative, three-terminal voltage regulator 46 which, in turn, outputs a second regulated, constant negative voltage (e.g. −5 v DC) through line 47.

As stated above, geophone assembly 37 is comprised of two horizontal phones or sensors 37a, 37b and one vertical phone or sensor 37c. Each phone generates analog signals representative of the acoustical signal received by that phone and outputs its analog signal to a respective analog channel 50. Since each channel 50 is identical, only one will be explained in detail.

The analog signal from the geophone passes through a low noise input amplifier 51 which takes in a differential signal and outputs a single-ended signal to programmable, gain pre-amplifiers 52, 53. The gains for amplifiers 52, 53 are programmable from the surface through cable 16 in step increments (e.g. 0 dB to 84 dB in steps of 6 dB). The signal from amplifier 53 is fed into input multiplexer 54. Test oscillator 55 and test pulse generator 56 are also multiplexed into the input multiplexer (MUX) 54 of each channel 50. Input MUX 54 is also programmable from the surface through cable 16 to selectively allow the analog signal, test oscillator, or test pulse through its respective channel.

The signal passes from input MUX 54 through programmable, low noise, low-cut filter 57 (e.g. slope of 18 dB/octave): a programmable low noise, high-cut filter 58 (e.g. slope of 72 dB/octave); and buffer amplifier 59. The signals from all three channels 50 are fed to analog multiplexer (MUX) 60 which is controlled from microprocessor system 61. Data from temperature sensor 62 (e.g. semiconductor type calibrated for 200° C. full scale) is processed through analog signal conditioner 63 and multiplexer 64 and is also supplied to analog MUX 60. The sensor 62 and related circuitry allows the temperature to be measured and recorded continuously as tomographic data is being acquired by the tool. Upon a command from microprocessor 61, MUX 60 will output either the analog signal from a selected channel 50 or the temperature signal from sensor 62.

The signal from MUX 60 is fed to instantaneous floating point (IFP) amplifier system 65 which can be controlled from the surface through cable 16 so that it can operate either in an IFP or a fixed gain mode (e.g. the fixed gain can be set from the surface from 0 to 30 dB in steps of 6 dB). The basic function of IFP 65 is to sample the signal, determine the amplitude of the sampled signal and apply appropriate gain on the sampled signal before passing it to the analog-to-digital (A/D) converter 66. For a more complete description of IFP 65, reference is now made to FIG. 5.

The signal from MUX 60 enters IFP 65 through high-speed precision monolithic sample and hold (S/H) amplifier 67 which samples and holds the signal for the duration of time it takes (a) to make a decision on the amount of gain to be applied and (b) for the signal to settle after the gain has been applied. The AC signal then passes through precision rectifier, absolute-value circuit 68 where it is converted to a precise absolute value. This is accomplished by using the input signal as its own reference in the balanced modulator topology. The signal is then fed to high-speed, A/D converter 69 (e.g. 8-bit) which digitizes the absolute value signal which, in turn, is outputted to programmable read only memory (prom) 70 which is programmed with a table of gain numbers. The output of A/D converter 69 is the address for prom 70. The contents of a particular address is fed through digital multiplexer (MUX) 71 to set the gain on the gain-ranging amplifier 72 when IFP amplifier is operating in its IFP mode. When IFP 65 is operating in a fixed gain mode, MUX 71 is controlled by microprocessor 61 to provide a fixed gain signal from line 73 to gain-ranging amplifier 72.

The signal from amplifier 72 passes to a self-calibrating A/D converter 66 (e.g. 16- bit, 16 microsecond) to which a precision high temperature reference voltage (e.g.,4.5 v) is supplied via line 75. Preferably, only the twelve most significant bits of this converter is used because of the high operating temperature range normally encountered by the BDG tool. Converter 66 is controlled by programmable counter/timer 66a and control logic 66b and also includes a S/H amplifier (not shown) which holds this signal and digitizes it, at which time S/H amplifier 67 releases the old signal and begins tracking a new signal, thus pipelining the operation.

The signal from converter 66 passes through output buffer 76 which is an assembly of first-in/first-out registerers (FIFO) (e.g. 16 bit wide by 16k deep). The information from buffer 76 is retrieved by microprocessor 61 to be processed and stored in memory. Microprocessor system 61 is comprised of a clock generator 61a (e.g. 12 Mhz) from which all other clocks in DGM 15a are derived. Control processing unit (CPU) 61b is a low power microprocessor (16-bit CMOS microprocessor) which cooperates with interrupt controller 61c and includes an address decoder 61d, a low power CMOS prom memory 61e (e.g. 128K ×16), and a low power CMOS static random access memory (RAM) 61f. The program which makes the microprocessor system 61 work is stored in prom 61e while the memory in RAM 61f is used in microprocessor operation, stacking, storing, and data buffering operations. This provides a large memory which enables the data in the DGM to be double buffered. Microprocessor system 61 also includes appropriate programmable peripheral interfaces 61g, 61h which direct commands, etc. throughout the system. For example, microprocessor 61 commands locking arm motor driver 77 through interface 61h to actuate motor 25 to extend or retract locking arm 26 depending on the polarity of the voltage which is controlled from the surface through cable 16.

Transmitting system 80 is used for transmitting the data to the surface and receiving commands from the surface through cable 16. System 80 comprises a programmable counter/timer 80a which is used to generate the programmable transmit and receive clocks required to operate data encoder/decoder 80b which, in turn, receives commands via conductors 1 and 2 of cable 16 and transmits data on conductor 7 of cable 16. Encoder/decoder 80b receives data for transmission from microprocessor system 61 through (a) hardware data compressor 81 which compresses the data prior to transmission, thus significantly increasing the data transmission rate; (b) FIFO register 82, and (c) a parallel-to-serial interface 83. The encoder/decoder 80b is connected to data buss 84 through a serial-to-parallel converter 85 and is connected to control buss 86 by line 87. Encoder/decoder 80b also checks for parity of the transmitted and received data.

It is to be understood that the foregoing described electronic and circuit components are merely representative of the present invention and that other types and values of components may be utilized where appropriate and available. In accordance with the preferred embodiment of the present invention, the following two tables set forth specific, commercially-available examples of the above described components (Table I) and typical specifications for the DGM (Table II).

TABLE I

| Ref. No. | Description | Mfg. Part No. | Manufacturer |
|---|---|---|---|
| 42 | +5V regulator | 42094-005 | A |
| 40 | +15V regulator | 42094-015 | A |
| 46 | −5V regulator | 42095-005 | A |
| 44 | −15V regulator | 42095-015 | A |
| 61g, 61h | Programmable Peripheral Interfacer | MD82C55A-5/B | B |
| 51 | Pre Amplifier | OPA27HT | C |
| 52, 53 | Programmable Gain | MN2020H/B | D |
| 54, 60 | Analog Multiplexer | HI1818A-2 | B |
| 59 | Quad Amplifier | HA1-5104-2 | B |
| 66 | A/D Converter | CS5016-TD16 | E |
| 76, 82 | FIFO 4K × 9 | IDT7204L120DB | F |
| 55 | Sine Wave Oscillator | SWR200CD | G |
| 66a, 80a | Programmable Counter | MD82C54/B | B |
| 80b | Manchester Encoder-Decoder | HD1-15530-8 | B |
| 61d | 1-of-8 decoder | 54HC138 | H |
| 61a | Clock Generator Driver | M82C84A/B | B |
| 61b | 16-Bit Microprocessor | MD80C86/B | B |
| 61c | Interrupt Controller | MD82C59A-5/B | B |
| 61f | 128K × 8 Static RAM | DHC8-M128H | I |
| 61e | 2K × 8 bit PROM | HM6-6617/883 | B |
| 62 | Temperature Sensor | AD590KH | J |
| 64 | 16 channel analog mux | HI1-0506-2 | B |

A Micropac Industries, Inc., Dallas, Texas
B Harris Semiconductor, Palm Bay, Florida
C Burr-Brown Corporation, Tucson, AZ
D Micro Networks, Worcester, MA
E Crystal Semiconductor Corporation, Austin, TX
F Integrated Device Technology, Santa Clara, CA
G Thaler Corporation, Tucson, AZ
H National Semiconductor, Santa Clara, CA
I White Technology, Inc., Phoenix, AZ
J Analog Devices, Norwood, MA

TABLE II

DIGITAL GEOPHONE MODULE SPECIFICATIONS

| | |
|---|---|
| MAX. NO. OF DGM'S: | 7 |
| INTERCONNECTING CABLES: | STANDARD 7-CONDUCTOR LOGGING CABLE |
| CONNECTORS: | MODIFIED GEARHART 7-PIN |
| MODULE SPACING: | 10 FT OR 20 FT TYPICAL |
| DIAMETER: | 3.25 INCHES |
| LENGTH: | 6 FEET |
| WEIGHT: | 90 LBS |
| CLAMPING SYSTEM: | ELECTRIC MOTOR W/GEARBOX |
| MAX. OPERATING TEMP.: | 175 DEGREES C. (347 DEGREES F.) |
| MAX. EXTERNAL PRESSURE: | 20,000 PSI |
| MAX. DEPTH: | 25,000 FEET |
| DATA TRANSMISSION RATES: | 50, 100, 200 KBITS/SEC |
| COMMAND TRANSMISSION RATES: | 3,50 KBITS/SEC |
| RE-TRANSMIT ON ERROR: | YES |

TABLE II-continued

| DIGITAL GEOPHONE MODULE SPECIFICATIONS | |
|---|---|
| MAX. CABLE LENGTH: | 25,000 FT. |
| DYNAMIC RANGE: | 100 dB |
| FREQUENCY RESPONSE: | 2 Hz-4000Hz |
| NO. OF SEISMIC CHANNELS: | 3 (1 VERT., 2 HORZ.) |
| GEOPHONE TYPES: | SENSOR SM-15HT, 14 Hz |
| PRE-AMP GAINS: | 0-84 dB IN 6 dB STEPS |
| IFP GAINS: | 0-30 dB IN 6 dB STEPS |
| LO-CUT FILTER: | OUT, 25, 65, 100 Hz @ 18 dB/OCTAVE |
| HI-CUT FILTER: | 750, 1500, 3000 Hz @ 72 dB/OCTAVE |
| A/D CONVERTER: | 12 MSB USED FROM A 16 BIT CONVERTER |
| SAMPLING RATES: | $\frac{1}{2}, \frac{1}{4}, \frac{1}{8}$ mSEC |
| RECORD LENGTHS: | 0.1 TO 2.0 SECS @ $\frac{1}{8}$ mSEC SAMPLING |
| | 0.1 TO 4.0 SECS @ $\frac{1}{4}$ mSEC SAMPLING |
| | 0.1 TO 8.0 SECS @ $\frac{1}{2}$ mSEC SAMPLING |
| | IN 0.1 SEC INCREMENTS |

Figure 6:
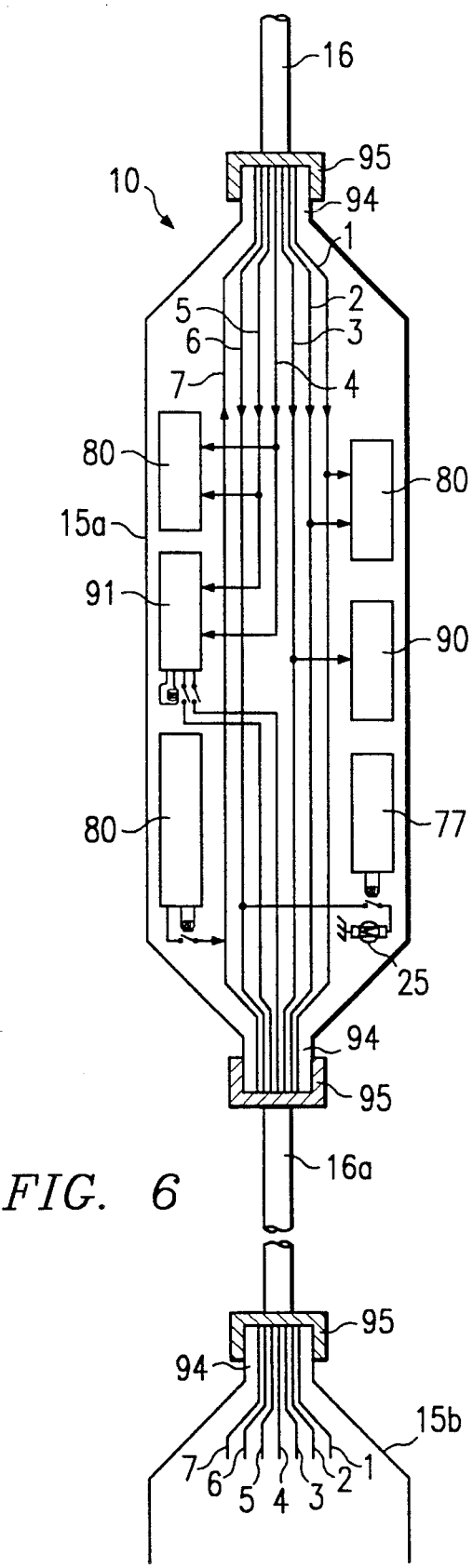
FIG. 6 is a wiring schematic for electrically connecting a plurality of DGMs with the conductors of a standard 7-conductor logging cable to form the borehole digital geophone tool of the present invention.

FIG. 6 schematically illustrates how a plurality of interchangeable DGMs 15 such as described above are electrically connected together to form BDG tool 14. The first DGM 15a is connected onto the end of a standard, 7-conductor logging cable 16 which, as the name implies, has a bundle of seven separate conductors encased in a jacket. The conductors have been numbered 1 through 7 for the purposes of description only and it is not meant to imply that any specific conductor has to be used for a specific purpose since the conductors are all the same and are interchangeable. As illustrated, conductors 1 and 2 are used to transmit positive and negative command signals, respectively, from the surface to command processor 80 in DGM 15a when the signals are addressed to that module or on to a subsequent DGM, e.g. 15b, when so addressed, and so on.

Conductor 3 transmits a timebreak signal from the surface to a timebreak signal conditioner 90 in the DGM which starts data acquistion upon receipt of signal. The timebreak signal is applied simultaneously to all of the operational DGMs 15 in tool 14 so that the data acquistion will start in all of the DGMs at the same time. Conductors 4 and 5 are used to conduct positive and negative electrical power, respectively, from the surface to the regulator section 35 and through a "next" DMG power controller 91 (e.g. relay to turn power on to the next DMG in tool 14 upon command). Conductor 6 is used to supply electric power to drive motor 25 to extend or retract locking arm 26 (FIG. 2) depending on polarity while conductor 7 provides the link for transmitting data to the surface.

All seven conductors of cable 16 functionally pass through the entire length of each DGM and terminate at connector 94 (e.g. 7-pin connector) at the lower end thereof which, in turn, mates with a complimentary connector (e.g. 7-socket connector, not shown) on cable 16 or cable length 16a to thereby effectively provide a continuous 7-conductor cable from the surface to the lower end of the last DGM in tool 14. It can be seen that the present invention provides a BDG tool 14 which can be suspended and operated from a standard, 7-connector logging cable wherein lengths of the same logging cable can be used to connect the modules of the tool together. This eliminates the need for special and expensive cables as is the case with known previous tools of this type. Now that the construction of tool 4 has been described in detail, the operation of the tool is set forth below.

Once BDG tool 14 has been assembled, it is lowered on logging cable 16 into well 11. The operator at the surface then initiates the start-up procedure. Power from the surface is supplied through conductors 4 and 5 of cable, 16 to the first DGM 15a memory test and then begins a power-up mode during which the DGM sends header information to the surface conductor 7 of cable 16 approximately every half second. The header information includes all tool voltages, temperature, and other default tool settings and status.

The operator now sends a command from the surface to assign a logical unit or address number to the first DGM 15a. As soon as DGM 15a receives its logical unit number (e.g. No. 1), it is no longer in the power-up mode and will stop sending the header information to the surface. DGM 15a is now programmed so that it will only respond to global commands (those intended for all DGMs) or commands specifically addressed to DGM 15a. To power up the next module (i.e. DGM 15b), the operator will send a command from the surface specifically addressed to DGM 15a commanding "next" module power controller 91 (FIG. 6) to turn the power on for the next DMG 15b. When power is supplied to next DGM 15b, it goes through a memory test and set itself up in the power-up mode, similarly as DMG 15a, and continues in the power-up mode until a logical unit number or address number is assigned (e.g. No. 2). This procedure is continued until all DMGs in tool 14 are powered up and have been assigned logical unit numbers. Of course, the power up sequence for the DGMs can be automatically controlled by programming the surface computer whereby intervention by an operator is unnecessary.

Once all of the DGMs have been powered up and have been assigned logical unit numbers, the operator can now run different tests from the surface. For example, pulse, internal oscillator and transmission tests can be run on each DGM and commands can be sent sequentially to each DGM to send data to the surface for analysis to determine if all DGMs are functioning properly.

The next step is to deploy the locking arms 26 of the DGMs, one at a time. The operator sends a command from the surface to the bottommost DGM 15e to drive motor 25 in a first direction to deploy arm 26 and lock DGM 15e in position against borehole 11. The current and voltage on motor 25 is continuously monitored until the current reaches a predetermined value, at which time power to motor 25 is shut off and the locking operation is complete. This procedure is repeated with each of the remaining DGMs until all are locked in position. Next,, the operator can take some sample test shots and analyze the data from each DGM to determine the best settings for preamplifier gains, low-cut filter setting, record length, IFP or fixed-gain operation, and stack count for the data.

Tool 14 is now ready to start acquiring data. The operator initiates a fire command to a source 13 in borehole 10 (FIG. 1). At the instant the source fires, a "timebreak" signal is generated and is transmitted simultaneously to each DGM in tool 14 through conductor 3 of the standard, logging cable 16. At the instant that this signal is received, all DGMs begin data acquistion. As acoustical energy generated by the firing of source 13 arrives at borehole 11, it is detected by the geophones and the resulting signals are processed and stacked in the memory of each respective DGM. After the complete stacked record has been acquired by each DGM, each DGM is commanded to transmit its respective data to the surface through conductor 7 of cable 16, serially, one at a time. During the time a DGM is transmitting data, a second data record can be acquired by that DGM into a separate buffer. Thus, data acquistion time is based primarily upon the maximum rate that data can be transmitted up cable 16. The following Table III shows example times with different sample rates and tool configurations.

TABLE III

| | | DATA TRANSMISSION TIMES | | | | |
|---|---|---|---|---|---|---|
| TOTAL # CHANNELS | TOTAL # DGM'S | TOTAL # BDG'S | SAMPLE RATE | RECORD LNGTH (SEC) | TOTAL # BYTES | TRANSFER TIME (SEC) |
| 3 | 1 | 1 | ½ | 1 | 48192 | 2.41 |
| 9 | 3 | 1 | ½ | 1 | 144576 | 7.23 |
| 21 | 7 | 1 | ½ | 1 | 337344 | 16.87 |
| 42 | 14 | 2 | ½ | 1 | 674688 | 16.87 |
| 3 | 1 | 1 | ¼ | 1 | 24192 | 1.21 |
| 9 | 3 | 1 | ¼ | 1 | 72576 | 3.63 |
| 21 | 7 | 1 | ¼ | 1 | 169344 | 8.47 |
| 42 | 14 | 2 | ¼ | 1 | 338688 | 8.47 |
| 3 | 1 | 1 | ⅛ | 1 | 12192 | 0.61 |
| 9 | 3 | 1 | ⅛ | 1 | 36576 | 1.83 |
| 21 | 7 | 1 | ⅛ | 1 | 85344 | 4.27 |
| 42 | 14 | 2 | ⅛ | 1 | 170688 | 4.27 |

What is claimed is:

1. A method of acquiring acoustical data from a borehole comprising:
   connecting a first digital geophone module (DGM) to a 7-conductor logging cable;
   connecting a second DMG to said first DMG by a separate length of said 7-conductor cable whereby each of the 7 conductors in the cable will functionally extend from the cable through said first DGM, said separate length of cable, and said second DGM;
   lowering said DGMs on said logging cable to a desired depth in said borehole;
   supplying power to said first DGM through dedicated power conductors in said cable to generate test data which is transmitted from said first DGM to the surface through a dedicated transmission conductor in said cable;
   transmitting a signal to said first DGM commanding said DGM to supply power from said power conductors through said separate length of cable to said second DGM to thereby generate and transmit test data from said second DGM to the surface through said dedicated transmission conductor in said cable;
   transmitting a timebreak signal down said dedicated, timebreak conductor in said cable to simultaneously actuate said first and second DGMs to begin acquistion of data;
   sensing acoustical energy at each of said DGMs and generating data signals representative thereof:
   storing said data signals in each DGM; and
   transmitting upon command said data signals from each DGMs to the surface through said transmission conductor in said cable.

2. The method of claim 1 including:
   transmitting an address signal to each of said DGMs through dedicated command conductors in said cable to cease transmission of test data and to assign an address number to each respective DGM before power is supplied to the next DGM.

3. The method of claim 2 including:
   locking each of said DGM at its respective depth in the borehole before beginning the acquisition of data.

4. The method of claim 3 including:
   sensing the temperature with each of said DGMs and generating a signal representative thereof; and
   transmitting said temperature signals upon command to the surface through said transmission conductor of said cable.

5. A borehole digital geophone (BDG) tool comprising:
   a plurality of digital geophone modules (DGM), each having an upper end and a lower end;
   means for connecting said upper end of the first of said plurality of DGMs to a standard, 7-conductor logging cable;
   each DGM comprising;
   a housing;
   means for locking said housing in position within a borehole;
   a geophone assembly for detecting acoustic signals and generating analog signals representative thereof;
   a processing assembly for digitizing and storing said analog signals;
   a transmitting assembly for retrieving said stored signals and transmitting same to the surface over a dedicated transmission conductor of said cable; and
   means within said housing for functionally extending each conductor in said 7-conductor logging cable from said upper end to said lower end of each DGM whereby each of said conductors are effectively extended from said logging cable through each of said DGMs to the lower end of the last of said plurality of said DGMs; and
   a separate length of said 7-conductor logging cable connecting said lower end of said each of said DGMs to the upper end of the next adjacent DGM.

6. The BDG tool of claim 5 wherein said means for locking said housing comprises:
- a locking arm pivotably mounted on said housing and movable between a retracted and an extended position;
- an electric motor operated by electrical power supplied from the surface through a dedicated motor power conductor of said cable; and
- means coupling said arm to said motor whereby said arm is extended when said motor rotates in a first direction and is retracted when said motor rotates in an opposite direction.

7. The BDG tool of claim 6 wherein said processing assembly of each DGM includes:
- means for receiving commands from the surface through dedicated command conductors of said cable.

8. The BDG tool of claim 1 wherein each DGM includes:
- means for supplying electric power from the surface to said DGM through dedicated electric power conductors of said cable; and
- means for supplying said electric power through said DGM to a next DGM upon receipt of a command from said surface through said command conductors of said cable.

9. The BDG tool of claim 8 wherein said geophone assembly comprises:
- a three-component geophone having two horizontal acoustic sensors and one vertical acoustic sensor, each sensor responsive to acoustical energy for generating a signal representative thereof.

10. The BDG tool of claim 7 wherein said processing assembly of each DGM comprises:
- a separate channel for processing said signal from each of said acoustic sensors;
- an instantaneous floating point (IFP) amplifier means for applying a gain to each of said signals;
- means for selectively feeding said signals to said IFP amplifier one at a time;
- a microprocessing system including a means for storing said signals from said IFP amplifier; and
- means for retrieving said stored signals and supplying same to said transmitting assembly for transmission to said surface through said dedicated transmission conductor of said cable.

11. The BDG tool of claim 10 wherein each DGM includes:
- a temperature sensor responsive to the temperature within said DGM and generating a signal representative thereof;
- means for supplying said temperature signal to said transmitting assembly for transmission to the surface through said dedicated transmission conductor of said cable.

* * * * *